US007885892B1

(12) United States Patent
Ajose et al.

(10) Patent No.: US 7,885,892 B1
(45) Date of Patent: Feb. 8, 2011

(54) METHOD AND SYSTEM FOR ASSESSING REPURCHASE RISK

(75) Inventors: Stella Y. Ajose, South Brunswick, NJ (US); Henry Buist, McLean, VA (US); Patricia R. Koscinski, Washington, DC (US); Eric L. Rosenblatt, Derwood, MD (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 12/858,321

(22) Filed: Aug. 17, 2010

Related U.S. Application Data

(62) Division of application No. 11/936,676, filed on Nov. 7, 2007, now Pat. No. 7,783,565.

(60) Provisional application No. 60/857,707, filed on Nov. 8, 2006.

(51) Int. Cl.
*G06Q 40/00* (2006.01)
(52) U.S. Cl. .................. 705/38; 705/36 R; 704/253; 715/764; 434/323; 706/45
(58) Field of Classification Search .............. 705/35, 705/36; 463/26; 455/522
See application file for complete search history.

(56) References Cited

U.S. PATENT DOCUMENTS

| | | | | |
|---|---|---|---|---|
| 5,361,201 A | * | 11/1994 | Jost et al. | 705/35 |
| 5,655,085 A | * | 8/1997 | Ryan et al. | 705/4 |
| 5,689,650 A | * | 11/1997 | McClelland et al. | 705/36 R |
| 5,802,499 A | | 9/1998 | Sampson et al. | |
| 5,819,226 A | | 10/1998 | Gopinathan et al. | |
| 5,884,289 A | | 3/1999 | Anderson et al. | |
| 6,018,723 A | | 1/2000 | Siegel et al. | |
| 6,094,643 A | | 7/2000 | Anderson et al. | |
| 6,119,103 A | | 9/2000 | Basch et al. | |
| 6,330,546 B1 | * | 12/2001 | Gopinathan et al. | 705/35 |
| 6,345,262 B1 | | 2/2002 | Madden | |
| 6,597,775 B2 | | 7/2003 | Lawyer et al. | |
| 6,658,393 B1 | | 12/2003 | Basch et al. | |
| 6,684,189 B1 | * | 1/2004 | Ryan et al. | 705/4 |
| 6,728,693 B1 | * | 4/2004 | Lautzenheiser et al. | 1/1 |

(Continued)

FOREIGN PATENT DOCUMENTS

WO  WO 03/071388 A2  8/2003

OTHER PUBLICATIONS

Community Investments Online, Credit Scoring and Fair Mortgage Lending, The Federal Reserve Bank of San Francisco (Community).*

(Continued)

*Primary Examiner*—Ella Colbert
*Assistant Examiner*—Chika Ojiaku
(74) *Attorney, Agent, or Firm*—Foley & Lardner LLP

(57) ABSTRACT

A method and system for evaluating loan repurchase risk are disclosed. The method includes receiving information related to the loan and determining a loan repurchase risk based on the information. The information may be used to determine a joint probability of an underwriting discrepancy sufficient to trigger a repurchase request and an adverse event in connection with the loan, such as default or delinquency. A repurchase report may provide feedback regarding factors contributing to a repurchase risk. In one embodiment, depending on the repurchase risk, the purchaser may waive repurchase rights in connection with the loan, thereby reducing the requirements of the seller to reserve capital for the loan.

20 Claims, 9 Drawing Sheets

U.S. PATENT DOCUMENTS

| | | | |
|---|---|---|---|
| 6,728,699 B1 * | 4/2004 | Lautzenheiser et al. | 1/1 |
| 6,826,267 B2 * | 11/2004 | Daum et al. | 379/102.03 |
| 6,837,436 B2 * | 1/2005 | Swartz et al. | 235/472.02 |
| 7,054,827 B1 * | 5/2006 | Lautzenheiser et al. | 705/10 |
| 7,120,599 B2 * | 10/2006 | Keyes | 705/36 R |
| 7,165,043 B2 | 1/2007 | Keyes et al. | |
| 7,249,040 B1 * | 7/2007 | Binns et al. | 705/4 |
| 7,251,624 B1 * | 7/2007 | Lee et al. | 705/35 |
| 7,315,842 B1 | 1/2008 | Wang | |
| 7,356,482 B2 * | 4/2008 | Frankland et al. | 705/8 |
| 7,379,910 B2 * | 5/2008 | Abrahm et al. | 705/37 |
| 7,415,436 B1 * | 8/2008 | Evelyn et al. | 705/37 |
| 7,536,332 B2 * | 5/2009 | Rhee | 705/36 R |
| 7,558,757 B2 | 7/2009 | Conroy et al. | |
| 7,577,601 B1 * | 8/2009 | Rademacher et al. | 705/36 R |
| 7,707,103 B2 * | 4/2010 | Prieston | 705/38 |
| 7,783,565 B1 * | 8/2010 | Ajose et al. | 705/38 |
| 2001/0029482 A1 * | 10/2001 | Tealdi et al. | 705/38 |
| 2001/0037284 A1 | 11/2001 | Finkelstein et al. | |
| 2002/0026339 A1 * | 2/2002 | Frankland et al. | 705/7 |
| 2002/0059137 A1 * | 5/2002 | Freeman et al. | 705/38 |
| 2002/0065753 A1 | 5/2002 | Schloss et al. | |
| 2002/0082961 A1 * | 6/2002 | Abrahm et al. | 705/35 |
| 2002/0095305 A1 * | 7/2002 | Gakidis et al. | 705/1 |
| 2002/0099649 A1 | 7/2002 | Lee et al. | |
| 2003/0033241 A1 | 2/2003 | Harari | |
| 2003/0074300 A1 | 4/2003 | Norris | |
| 2003/0093366 A1 | 5/2003 | Halper et al. | |
| 2003/0158751 A1 * | 8/2003 | Suresh et al. | 705/2 |
| 2004/0030638 A1 * | 2/2004 | Dwin | 705/38 |
| 2004/0030649 A1 * | 2/2004 | Nelson et al. | 705/44 |
| 2004/0128226 A1 * | 7/2004 | Kwan | 705/37 |
| 2004/0215554 A1 * | 10/2004 | Kemper et al. | 705/38 |
| 2004/0225596 A1 * | 11/2004 | Kemper et al. | 705/38 |
| 2005/0027626 A1 * | 2/2005 | Garcia | 705/35 |
| 2005/0044026 A1 | 2/2005 | Leistner | |
| 2005/0203834 A1 | 9/2005 | Prieston | |
| 2005/0262013 A1 | 11/2005 | Guthner et al. | |
| 2006/0036521 A1 | 2/2006 | Laber et al. | |
| 2006/0059073 A1 * | 3/2006 | Walzak | 705/35 |
| 2006/0074793 A1 | 4/2006 | Hibbert et al. | |
| 2006/0106690 A1 * | 5/2006 | Williard et al. | 705/35 |
| 2006/0143113 A1 * | 6/2006 | Bercovitz | 705/38 |
| 2007/0106591 A1 | 5/2007 | Waisbren | |
| 2007/0250439 A1 * | 10/2007 | Crocker | 705/38 |
| 2008/0052214 A1 | 2/2008 | Martinez et al. | |
| 2008/0120213 A1 | 5/2008 | Morik | |
| 2008/0262956 A1 * | 10/2008 | De La Motte | 705/37 |
| 2009/0240630 A1 * | 9/2009 | Casey et al. | 705/80 |

OTHER PUBLICATIONS

Greg Davis, Scotsman Guide Residential Edition, Broker to Banker, Nov. 2005 (Scotsman).*

Sonyma, Submission of Post Closing Loan Files Training Module 2008 (Sonyma).*

Kay, Giesecke, Credit Risk Modeling and Valuation: An Introduction, Oct. 24, 2004 (Valuation).*

"Community Investments Online, Credit Scoring and Fair Mortgage Lending", *Community Investments*, (2010), 16 pages, Federal Reserve Bank of San Francisco.

Bergsman, Steve, "Cover Report: Fraud and Risk Management—A High-Tech Battle with Fraud", Aug. 2006, pp. 36-43, *Mortgage Banking*, USA.

Berry et al., "Countrywide's Suit Illustrates Exception Risk—A Common Waiver Played Role in Fraud Case", Sep. 29, 2008, 2 pages, *American Banker*, USA.

Berry, Kate, Warehouser Suing Firm, Borrowers in Fraud Case, Oct. 3, 2006, 3 pages, *American Banker*, USA.

Davis, G., "Broker to Banker, A Smooth Transition Starts with Getting your Financial House in Order", *Scotsman Guide Residential Edition*, Nov. 2005, 2 pages, Scotsman Publishing Inc.

Dezube, Dona, "Cover Report: Fraud and Risk Management—Mortgage", Aug. 2006, pp. 44-52, *Mortgage Banker*, USA.

Giesecke, K., "Credit Risk Modeling and Valuation: An Introduction", *Credit Risk: Models and Management*, Aug. 19, 2002, 67 pages, vol. 2, Riskbooks, London.

Hagerty et al., "Town's Residents Say They Were Targets of Big Mortgage Fraud", Sep. 28, 2006, 8 pages, Section: p. A1, *The Wall Street Journal*, USA.

McMahon, M., "Lending to the Mortgage Banking Industry", *Journal of Commercial Lending*, Dec. 1992, 6 pages, vol. 75, No. 4.

Simon et al., "Whistling Past Housing's Graveyard?—Bad Loans Draw Bad Blood", Oct. 9, 2006, 3 pages, Section: p. C1, *The Wall Street Journal*, USA.

Sonyma, "Submission of Post-Closing Loan Files Training Module", Jun. 2008, 27 pages.

Subar, David, "Cover Report: Technology—The New Battle Against Fraud", Mar. 2007, pp. 109-113, *Mortgage Banking*, USA.

Wisniowski, Charles, "Newsmaker—Mortgage Fraud Expert Rachel Dollar—The Mortgage Fraud Blog", Feb. 2006, pp. 26-31, *Mortgage Banking*, USA.

* cited by examiner

METHOD AND SYSTEM FOR ASSESSING REPURCHASE RISK

CROSS-REFERENCE TO RELATED PATENT APPLICATIONS

This application is a divisional application and claims priority to U.S. patent application Ser. No. 11/936,676, filed Nov. 7, 2007. U.S. patent application Ser. No. 11/936,676 claims priority to U.S. Provisional Patent Application No. 60/857,707, filed Nov. 8, 2006, both of which are incorporated herein by reference in their entirety.

BACKGROUND OF THE INVENTION

The purchase of a home is typically the largest investment that a person makes. Because of the amount of money required to purchase a home, most home buyers do not have sufficient assets to purchase a home outright on a cash basis. In addition, buyers who have already purchased a home may wish to refinance their home. Therefore, potential homebuyers consult lenders such as banks, credit unions, mortgage companies, savings and loan institutions, state and local housing finance agencies, and so on, to obtain the funds necessary to purchase or refinance their homes. These lenders offer mortgage products to potential home buyers and, after the borrower applies for a loan, underwrite the borrower's loan application. Underwriting is the process of evaluating a loan application to determine the risk involved for the lender. It often involves an analysis of the borrower's ability and willingness to repay the debt and an appraisal of the value of the property. The lenders who make (originate and fund) mortgage loans directly to home buyers comprise the "primary mortgage market."

When a mortgage is made in the primary mortgage market, the lender can: (i) hold the loan as an investment in its portfolio, or (ii) sell the loan to investors in the "secondary mortgage market" (e.g., pension funds, insurance companies, securities dealers, financial institutions and various other investors) to replenish its supply of funds. The loan may be sold alone, or in packages of other similar loans, for cash or in exchange for "mortgage backed securities" (MBS) which provide lenders with a liquid asset to hold or sell to the secondary market. By choosing to sell its mortgage loans to the secondary mortgage market for cash, or by selling the mortgage backed securities, lenders get a new supply of funds to make more home mortgage loans, thereby assuring home buyers a continual supply of mortgage credit.

Often, an investor in the secondary mortgage market may use an automated underwriting to determine whether the loan meets the credit risk eligibility and loan product eligibility requirements of the investor based on loan application information provided by the lender. Although the final underwriting decision is made by the lender, the lender (or alternatively a broker) may submit a loan to an automated underwriting engine of the investor prior to closing. In other situations, for example, in the context of bulk loan sales, the loan may be submitted to the automated underwriting engine only after closing. The loan information evaluated by the automated underwriting engine typically includes information relating to borrower-specific risk factors, loan-specific risk factors, and property-specific risk factors. Borrower-specific risk factors may include factors such as the borrower's credit rating or score, as well as other factors such as a borrower's income and financial reserves. Property-specific risk factors may include factors such as the type of property (e.g., manufactured housing, etc.). Loan-specific risk factors may include factors such as the loan-to-value ratio, the loan amount, the loan purpose, and so on. The loan application information is typically collected by the lender or mortgage broker from the borrower and from other sources. To the extent that the loan application information is not correct, this undermines the underwriting process and may result in an inaccurate assessment of the risk involved for the lender and any subsequent investor in the loan.

Underwriting discrepancies may occur for a variety of reasons. For example, a borrower may provide inaccurate information concerning the borrower's income, existing debt, and so on. Likewise, where an appraiser is appraising a home, there may be pressure to overvalue the property in order to achieve a certain loan to value ratio and thereby enhance the borrower's chances of getting approved for a loan (sometimes referred to as "appraisal bias").

Lenders originate mortgages and are best-situated to ensure that the information collected from the borrower and from other sources is accurate. If a loan is sold in the secondary mortgage market, the contracts governing the transaction often include representations and warranties made by the lender regarding the underwriting that has occurred. If there is a breach of the representations and warranties (e.g., if the loan application information is not accurate or if there are other underwriting discrepancies), the contract may also provide that the lender or other seller may be required to repurchase the loan. The repurchase right thereby serves to protect the purchaser from bearing the risk of deficiencies in the underwriting process carried out by the lender. The circumstances in which the repurchase rights may be exercised are determined by the contractual language governing the sale of the loan from the seller to the purchaser but, generally, if an underwriting discrepancy is found, the seller may be required to repurchase the loan.

Loan repurchase rights are generally exercised when the loan goes into default or is delinquent. For example, upon going into default or delinquency, the loan file may be reviewed by the purchaser and it may be determined that some of the loan application data was incorrect or that the loan application was otherwise incorrectly underwritten, at which point the lender is obligated to repurchase the loan. This creates a need for lenders to manage the repurchase risk that they bear in connection with loans that they have sold into the secondary mortgage market. For example, lenders must retain capital reserves sufficient to enable them to repurchase loans which have their repurchase right exercised by the purchaser.

A need exists for improved methods and systems that provide an accurate measure of the risk in connection with repurchase rights associated with loans. A need also exists for improved methods and systems for managing repurchase risk in connection with loans. It will be appreciated that, although certain features and advantages are described, other embodiments of the invention may be implemented that do not have some or all of these features or advantages, but rather which have other features and advantages.

SUMMARY OF THE INVENTION

One embodiment of the invention relates to a method of evaluating the repurchase risk of a loan at the time of delivery. The method includes receiving information related to the loan, determining a joint probability of an underwriting discrepancy and a loan default, determining a loan repurchase risk based on the joint probability, and providing a repurchase risk report.

Another embodiment of the invention relates to a method of managing loan repurchase rights for a plurality of loans.

The method includes determining a repurchase risk for each of the plurality of loans, waiving repurchase rights on a first subset of the plurality of loans which have the repurchase risk below a predetermined threshold, and notifying a lender of which loans have repurchase rights that have been waived and which loan repurchase rights have been retained.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION OF THE PREFERRED EMBODIMENTS

Figure 1:
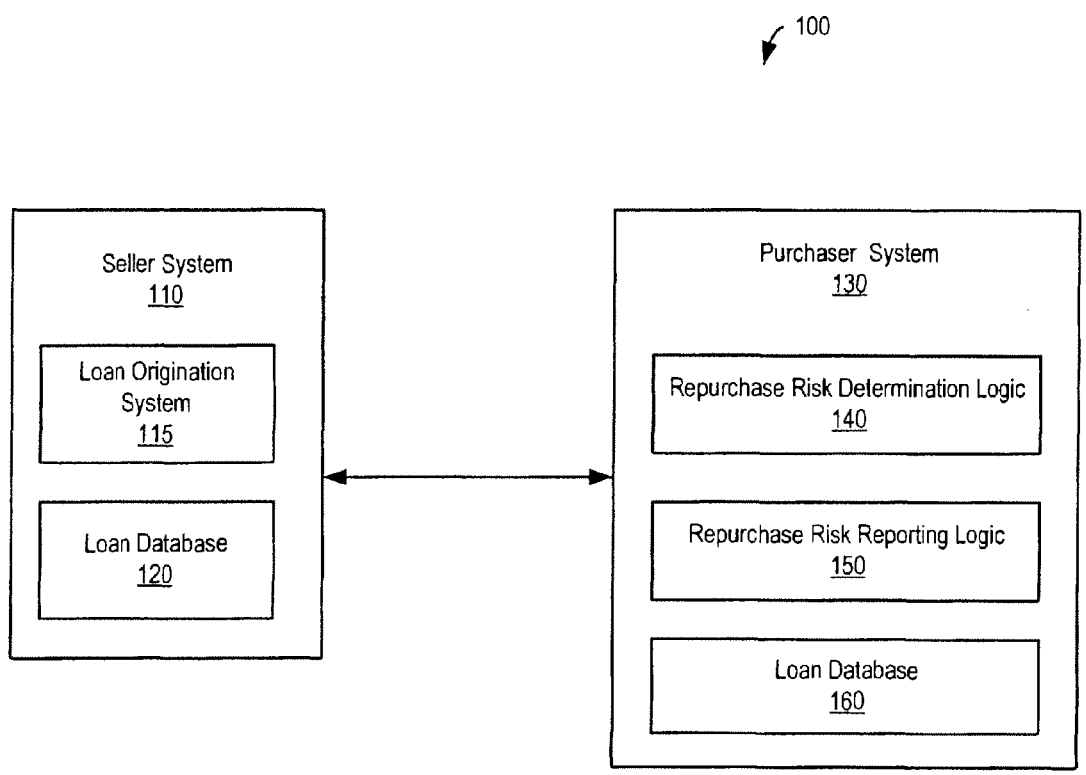
FIG. 1 is a block diagram illustrating a system for managing repurchase rights according to an embodiment.

Referring now to FIG. 1, FIG. 1 shows a system 100 for managing repurchase rights. The system 100 includes a mortgage seller system 110 and a mortgage purchaser system 130. The systems 110 and 130 may be computer-implemented systems and may comprise stored program logic configured to perform the various operations described herein. The seller system 110 may be associated with and configured to be used by an entity that sells mortgage loans in the secondary mortgage market, such as a lender. The seller system 110 may include a loan origination system 115 and a loan database 120. The loan origination system 115 may be generally configured to allow the seller (e.g., a lender or a third party originator such as a broker) to perform tasks associated with originating a mortgage, such as collecting loan application data from a borrower, obtaining underwriting recommendations or decisions, ordering other services associated with originating loans (e.g., obtaining a credit report, title, MI, registering a loan, rate locking loan, obtaining a price for a loan, etc.), and so on. The loan origination system 115 may store loan application data in database 120. As will be appreciated, the seller of the mortgage loans need not be the entity that originated the mortgage loans (e.g., the loan may have been originated by a broker or correspondent, the seller may itself be selling mortgage loans that it purchased from another seller, and so on). Additionally, although the seller system 110 in FIG. 1 is shown as including loan origination system 115, other arrangements are possible. For example, seller system 110 may be accessible to users (e.g., brokers, correspondents, and so on) via an Internet portal (e.g., a web site of the seller), and the loan origination system may be located remotely with such users.

The purchaser system 130 is associated with and configured to be used by an entity that purchases mortgages in the secondary mortgage market. Herein, for convenience, such an entity is referred to as a "purchaser," although it should be understood that the purchaser may participate in the secondary market in other, different, or additional ways (e.g., as a loan guarantor, as a loan securitizer, and so on) and need not, in any event, purchase the loan directly from the originator. The purchaser system 130 includes repurchase risk determination logic 140, repurchase risk reporting logic 150, and loan database 160.

After mortgage loans are purchased from the seller, at delivery, purchaser system 130 receives the loan data from the lender system 110. The risk determination logic 140 uses the loan data to assess repurchase risk associated with the mortgage loans. For example, the risk determination logic 140 may estimate the probability that a mortgage loan will have an underwriting discrepancy, potentially resulting in the repurchase rights being triggered and the repurchase of the loan by the lender. The probability of the underwriting discrepancy alone may be determined or, preferably, the joint probability of the underwriting discrepancy occurring in combination with an adverse event related to the loan (e.g., loan default, loan delinquency, and so on) may be determined. The purchaser may provide information relating to this repurchase risk to the seller, e.g., purely for informational purposes, to assist the seller with improving its underwriting processes, to assist the seller with managing its repurchase risk, to facilitate an arrangement in which the amount of capital reserved by the seller varies depending on the repurchase risk determined by the repurchase risk logic 130, and/or for other reasons. The manner in which the repurchase risk information may be used is discussed in greater detail below.

Figure 2:
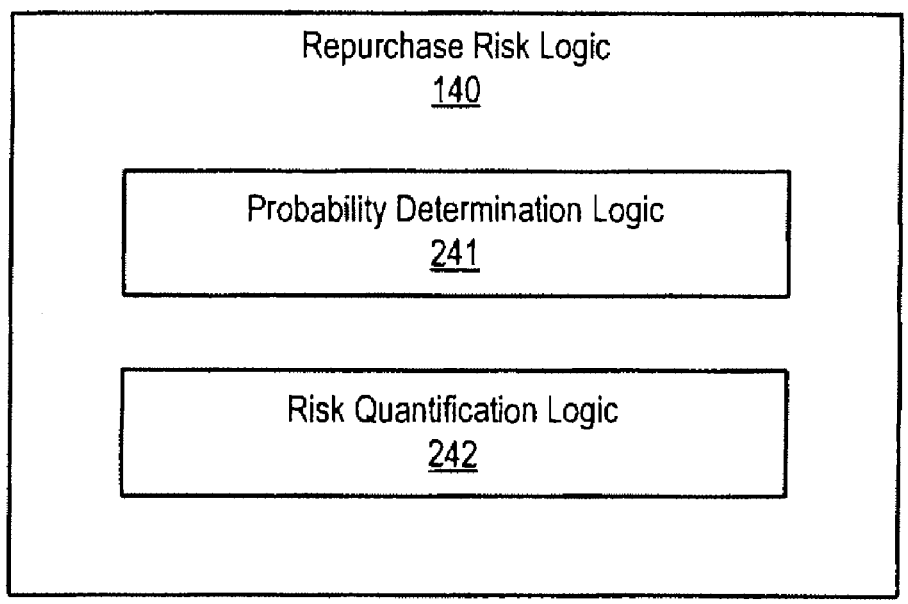
FIG. 2 is a block diagram illustrating repurchase risk logic in further detail according to an embodiment.

FIG. 2 illustrates an embodiment of the risk determination logic 140. The risk determination logic 140 includes probability determination logic 241 and risk quantification logic 242. Probability determination logic 241 receives loan data from the seller system 110 and uses the loan data to estimate the repurchase risk associated with the mortgage loans. The repurchase risk may be estimated by determining the probability of one or more events associated with the mortgage loan.

Figure 3:
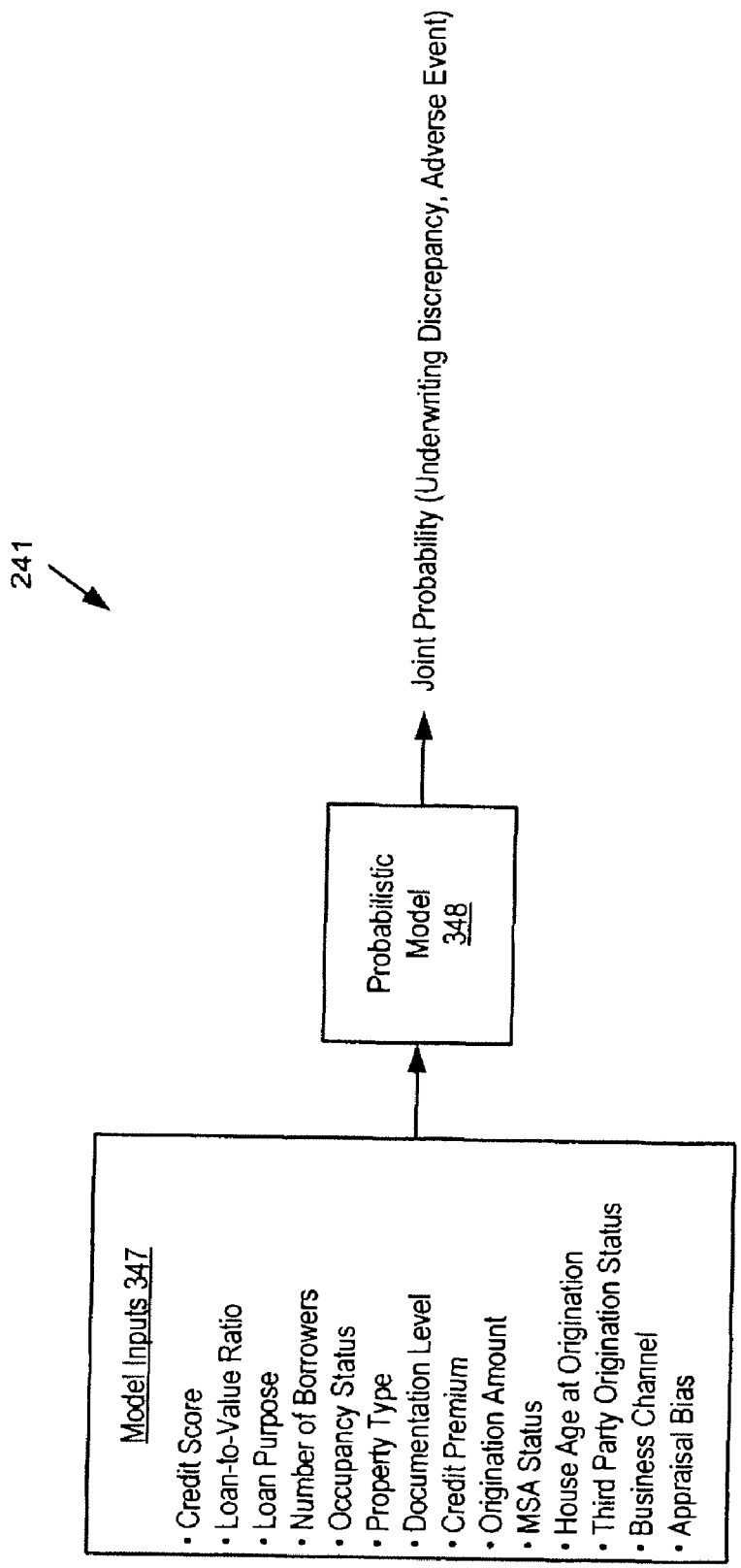
FIG. 3 is a block diagram illustrating probability determination logic in further detail according to an embodiment.

FIG. 3 illustrates an embodiment of the probability determination logic 241 in greater detail. In the example of FIG. 3, the probability determination logic 241 determines the probability of both of the following two events occurring: (i) the mortgage loan having an underwriting discrepancy sufficient to trigger a repurchase request and (ii) an adverse event (e.g., default, delinquency) occurring in connection with the mortgage loan. The probability of multiple events jointly occurring is referred to herein as a "joint probability." For a given mortgage loan, the joint probability described above is determined by applying loan data (model inputs 347) to a probabilistic model 348. The loan data that is used may be loan data that is received at delivery, which may be more complete and/or more accurate than the loan application data that is used to underwrite the mortgage loan prior to closing. Such loan data may include, for example, borrower-specific information, loan-specific information, and property-specific information. For example, as shown in FIG. 3, such loan data may include credit score, loan-to-value ratio, loan purpose, number of borrowers, occupancy status, property type, documentation level, credit premium (e.g., the extent to which the borrower paid an interest rate premium for the mortgage loan), origination amount, MSA (metropolitan statistical area) status (e.g., MSA or non-MSA), house age at origination, third party origination (e.g., TPO broker, TPO correspondent, undefined TPO, non-TPO), and business channel (e.g., the business channel through which the mortgage loan was purchased).

Additional and/or different loan data may also be used by probabilistic model 348. For example, in one embodiment, the joint probability is further determined based on appraisal bias. For example, appraisal bias may be estimated using an automated property valuation engine, which may be a computer-implemented engine used to generate an estimated value for the property based on pricing information for comparable properties in recent property sale transactions. Appraisal bias may be estimated by comparing the property value as set forth in the loan application data and the property value as estimated by the automated property valuation engine. The pricing information for comparable properties used by the automated valuation engine may be more up to date at the time of delivery than at the time of underwriting, particularly in volatile housing markets. Accordingly, a more accurate estimate of appraisal bias may be available at delivery than when the mortgage loan is underwritten.

The probabilistic model 348 may be constructed so as to provide an accurate estimate (e.g., as accurate as possible) of the joint probability based on the model inputs 347. For example, statistical modeling software may be used to perform a regression analysis or other analysis of loan data for prior mortgage loans for which performance information is known (i.e., including whether underwriting discrepancies existed and whether the adverse event occurred). The analysis may be used to recursively determine a set of optimal weighting coefficients (e.g., one weighting coefficient for each respective model input) which result in the most accurate prediction of whether the combination of the joint probability events (e.g., underwriting discrepancy and adverse event) occurred for the mortgage loans used to construct the probabilistic model 348.

As will be appreciated, the model 348 may be determined or perceived to have varying levels of accuracy in different scenarios, and it may be desirable to further process (e.g., override, at least to some extent) the output of the model to reflect such varying levels of accuracy. For example, exotic mortgage loans may exist which have unique payment features (e.g., skip-pay features, interest rate adjustment features, amortization features, and so on). Such features may cause these loans to perform differently than more conventional mortgages. Given that such mortgage loans are more unique, there may not be enough such loans for which performance histories are available to generate an accurate model. The model generated based on more conventional loans may be used, but the different performance characteristics may result in the model being perceived as being less reliable for predicting the performance of such exotic loans. In such instances, it may be desirable to multiply the output of the model by a risk multiplier (having a value greater than one) to reflect the heightened uncertainty associated with such loans and to allow the seller and the purchaser to treat such loans more conservatively. As another example, a risk multiplier may be used to quantify an increased or decreased risk associated with certain types of mortgage such as interest only, conventional, interest only, or jumbo, if the model 348 is perceived to be less accurate for such mortgages. Likewise, a risk multiplier may be used for certain property types, e.g., to reflect pricing volatility for those properties. For example, a certain property type (e.g., condominiums) may have risen in value during a recent preceding time period and therefore the model 348 may tend to predict a low repurchase risk for properties of that property type. However, if the pricing increases are perceived as unsustainable, the unsustainability may not otherwise be reflected in the model 348, and it may be desirable to use a risk multiplier to override the output of the model 348. Likewise, a risk multiplier may be used in connection with certain types of borrowers, e.g., to encourage loans to those borrowers. For example, a fractional risk multiplier (having a value between zero and one) may be used to override (at least to some extent) the output of the model for underserved borrowers, so that loans to such borrowers receive lower repurchase risk scores and therefore are more likely to receive repurchase waivers, as described below.

Referring again to FIG. 2, depending on how the information generated by the probability determination logic 241 is to be used, it may be desirable to generate a monetary quantification of the risk. Accordingly, risk quantification logic 242 quantifies the risk associated with a loan based on the monetary value (e.g., unpaid principal balance) of the loan. For example, a loan for $100,000 which has a joint probability of 0.25% would have a quantified risk of $250, while a loan of $400,000 which has the same joint probability would have a quantified risk of $1000.

Figure 4:
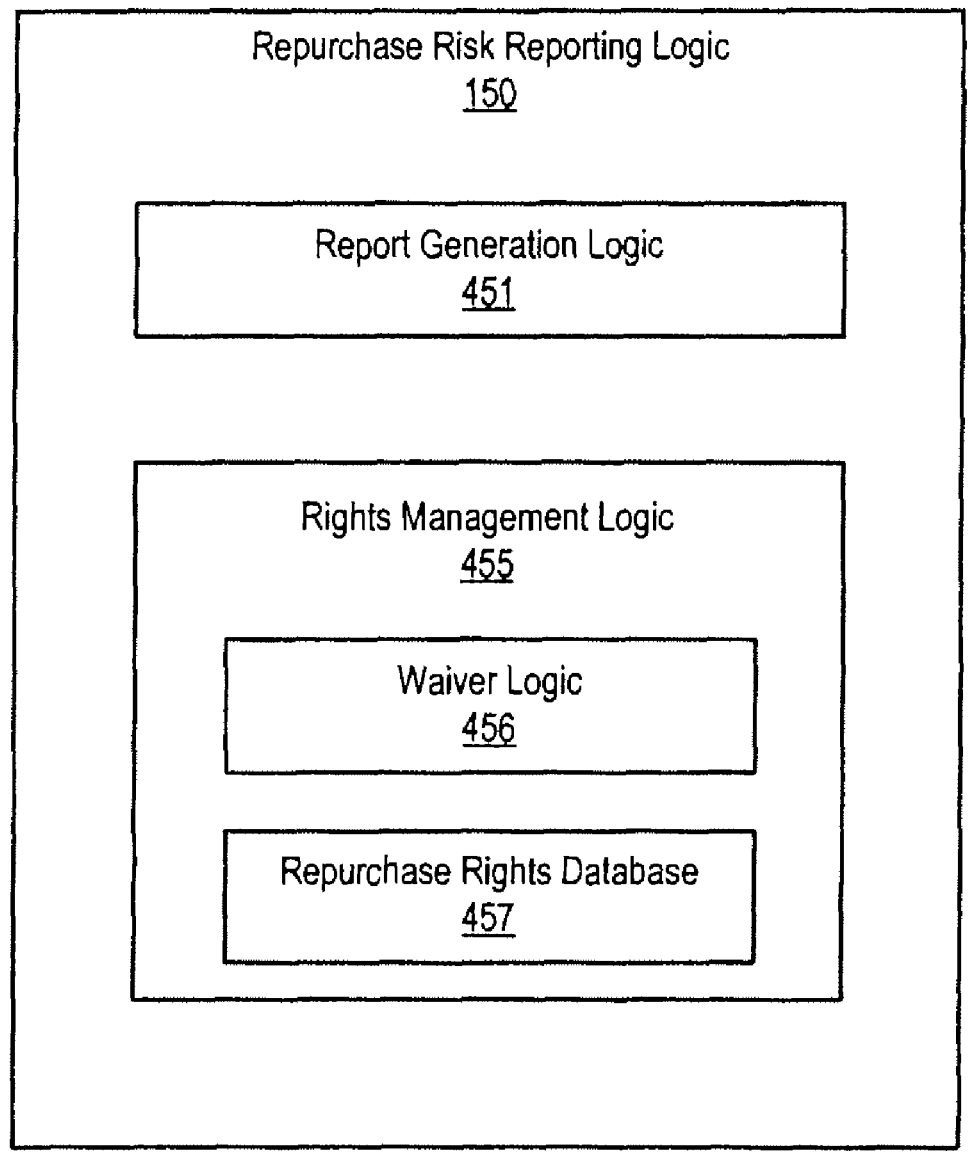
FIG. 4 is a block diagram illustrating repurchase risk reporting logic in further detail according to an embodiment.

FIG. 4 illustrates an embodiment of repurchase risk reporting logic 150. The repurchase risk determined by the risk determination logic 140 may be used for a variety of purposes. To this end, the risk reporting logic 150 includes report generation logic 451 which may be used to generate various reports that may be provided to the lender or other seller purely for informational purposes. The risk reporting logic 150 also includes rights management logic 455 which may be used to analyze the repurchase risk for individual loans to determine whether the repurchase rights for the loans are waived by the purchaser and to report the results of such analysis to the lender.

With reference first to the report generation logic 451, it may be desirable to provide the lender or other seller with reports summarizing the risk analysis performed by the risk determination logic 140. For example, after the seller sells a group of loans to the purchaser, the report generation logic 451 may be used to generate a report listing the loans that were sold and an identification of the repurchase risk for each loan. The identification may be binary in nature (e.g., pass/fail). As another example, the identification may be provided in the form of a repurchase risk score which corresponds to the level of risk (e.g., a range of numeric values, proportionally or otherwise related to the repurchase risk, with a low score corresponding to low repurchase risk and a high score corresponding to a high repurchase risk). The loans that were sold may also be rank-ordered according to the level of repurchase risk. Such information may be used by a lender or other seller to improve its processes, to manage its repurchase risk, or for other purposes. For example, if a lender sells a group of fifty loans to the purchaser, and ten of the loans are assigned a repurchase risk of "fail," and all ten of those loans share a common aspect of the lender's underwriting process (e.g., they were all underwritten by the same individual), then the lender can take corrective action with respect to that aspect of its underwriting process. Such feedback information helps lenders focus attention on those aspects of their underwriting processes that are creating the most repurchase risk. Additionally, the feedback information may be provided earlier in the loan lifecycle. For example, it is not necessary for the lender to wait until the ten loans go into default and for the underwriting discrepancies to be identified in order to receive information indicating that a problem may exist with its underwriting processes.

With reference to the rights management logic 455, in one embodiment, the repurchase risk determined by the risk determination logic 140 may be used to implement an arrangement in which repurchase rights are waived for loans with low repurchase risk scores. To this end, the waiver logic 456 determines whether the repurchase rights for a loan are to be waived and repurchase rights database 457 stores the results of such analysis (i.e., the waiver or non-waiver of repurchase rights for individual loans). Waiver logic 456 may apply a set of business rules to the repurchase risk to determine whether a loan should have its repurchase rights waived or whether the rights will be retained. For example, loans with a repurchase risk score below a certain threshold may have repurchase rights waived. The waiver logic 456 may be configured to implement other criteria, contractual terms, business goals and/or other objectives. For example, when the lender receives the report showing the lenders that have a repurchase risk of "fail," the lender may be given the option to purchase a waiver for any selected one or more of the loans with the failing score. As another example, the waiver logic 456 may be used to implement different pricing terms, such that the fee charged for the waiver of repurchase rights may be determined based on the repurchase risk score. As another example, repurchase waivers may be offered for certain types of mortgage products and not others (e.g., or property types, loan purpose, and so on), and the waiver logic 456 may include business rules to implement such variations. For example, to encourage mortgage loans to underserved borrowers, the waiver logic 456 may include business rules to implement different thresholds or different pricing rules so that such loans receive more favorable treatment.

Figure 5:
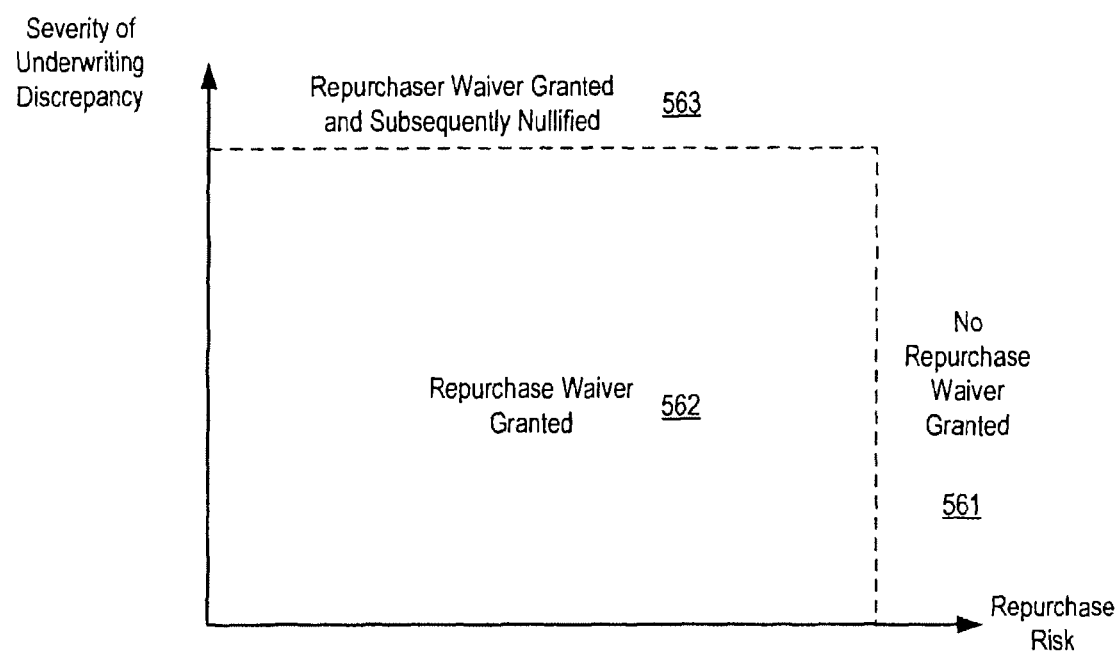
FIG. 5 is a graph diagram illustrating placement of loans into various segments according to an embodiment.

Referring now to FIG. 5, FIG. 5 is a graph showing an example of the treatment of different loans in the arrangement of FIG. 1. Loans with a repurchase risk above a certain threshold do not receive a repurchase waiver and fall into a region 561. As shown in FIG. 5, however, depending on the underwriting processes of the lender, it may be the case that most loans have a repurchase risk which is below the threshold and therefore causes the loans to fall into a region 562 in which repurchase rights are waived.

In an embodiment, the seller system 110 is provided with information from the repurchase rights system regarding whether a loan has had its repurchase rights waived or retained. This information may have various levels of detail. For example, the seller system 110 may be provided with a report specifically identifying the loans for which repurchase rights have been waived. The seller may simply be notified whether repurchase rights have been waived, but not be provided with any specific information regarding the calculated risk of the loan. In another embodiment, the seller may be provided with a report classifying the loans based on their repurchase risk probability or quantified repurchase risk such that the seller is able to determine the relative risk for each loan classification. In yet another embodiment, the seller may be provided with the calculated repurchase risk score or the quantified repurchase risk for each loan.

As discussed previously, sellers typically retain in reserve a certain amount of capital equal to some portion of the loan in order to cover the potential repurchase of a loan. Therefore, repurchase rights create a liability for the seller that causes the seller to reserve capital that may otherwise been available for make further loans or for other purposes. However, providing a seller with information regarding the status of the repurchase rights allows the seller to manage the capital held in reserve to cover loan repurchases. Depending on the underwriting processes of the seller, the seller may receive repurchase waivers, and may be relieved of the obligation to reserve capital for these loans. That is, the seller may decide not to reserve capital for those loans for which the repurchase rights have been waived. For example, if 90% of repurchase rights are waived, the seller may reduce the capital reserve that would have otherwise been necessary and may reserve capital only for the remaining 10% of the loans. If the repurchase risk is quantified and assigned a monetary value, as described above, the seller may decide to base the amount of capital it reserves based on the quantified repurchase risk.

As will be appreciated, the waiver of repurchase rights may not be a complete waiver. For example, the contractual terms associated with the waiver may specify that, if an underwriting discrepancy is found that is sufficiently severe, then the waiver of repurchase rights is nullified. Thus, after a loan goes into default, an audit may be performed to assess whether the waiver should be nullified, placing the loan into a region 563 in FIG. 5. What constitutes a "sufficiently severe" underwriting discrepancy may be specified in the contractual terms of the waiver but, generally, for example, may relate to issues such as fraud, misrepresentation, predatory lending, ineligibility of the mortgage for purchase by the purchaser, and so on.

In one embodiment, the purchaser may initially retain repurchase rights and then subsequently waive the repurchase rights. For example, certain facts may reduce the repurchase risk over time. For example, after loan repayments have been made on time for a particular length of time, the repurchase risk may be recalculated and, if it is sufficiently low, a waiver may be granted. The additional on-time payment history may result in a reduced likelihood of the adverse event in connection with the loan, thereby reducing repurchase risk. Thus, a loan may not initially receive a waiver of repurchase rights, but may subsequently receive a waiver where the repurchase risk for the loan is reduced over time.

In addition, in one embodiment, rather than recalculating the repurchase risk, an arrangement may be implemented in which the waiver is automatically granted after a predetermined period of time. For example, waiver logic 456 may include logic specifying that loans which have received on-time payments for a period of two years will receive a waiver of repurchase rights regardless of the calculated repurchase risk. For example, for an exotic loan, a decision may be made to not grant any waivers initially, regardless of the repurchase risk score, but to grant a waiver after two years if the borrower makes on time payments during that time period.

Figure 6:
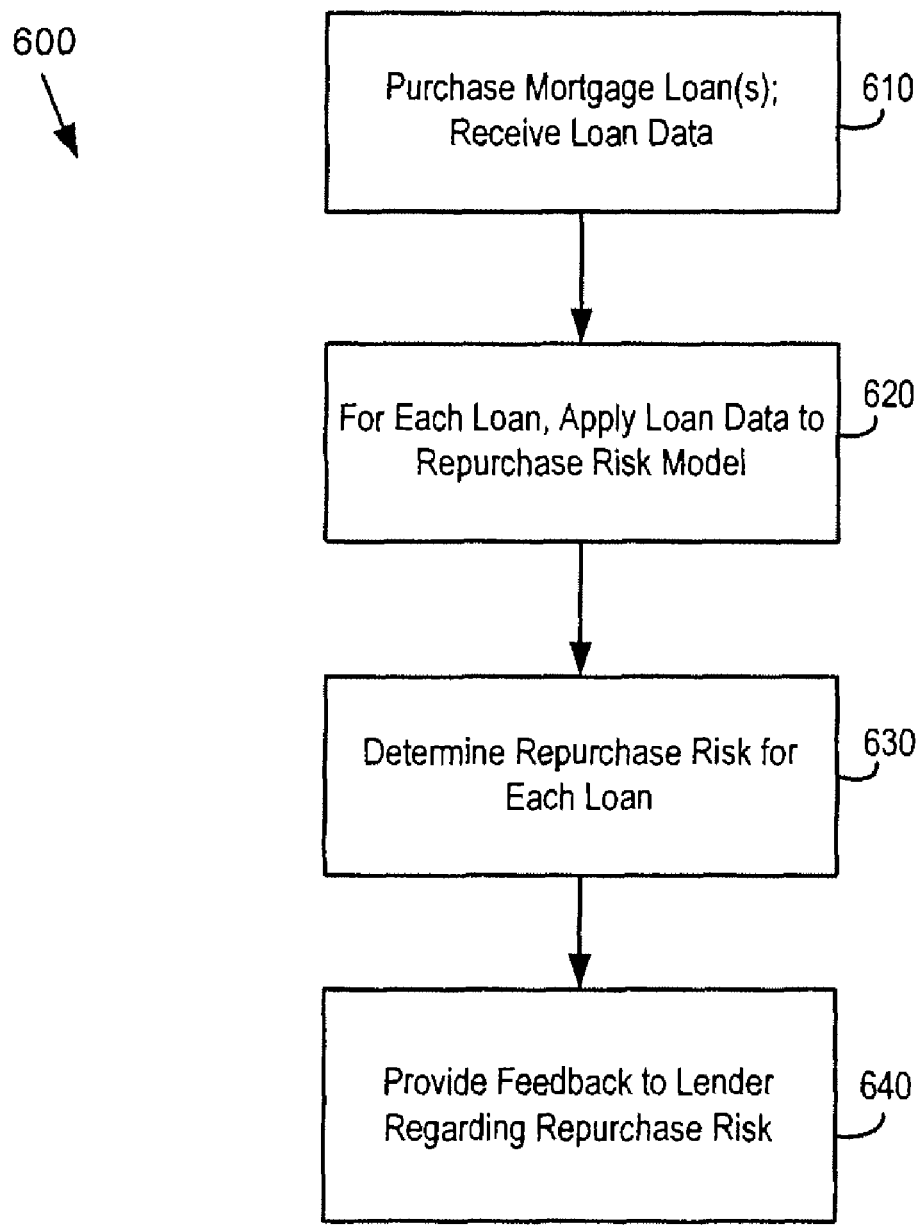
FIG. 6 is a block diagram illustrating a method for a loan purchaser to manage repurchase rights according to an embodiment.

Referring now to FIGS. 6-9, FIGS. 6-9 show various processes that may be implemented by the purchaser or seller in accordance with the teachings set forth above. FIG. 6 illustrates a method 600 in which the loan purchaser provides feedback information regarding repurchase risk to a seller. At step 610, the purchaser purchases one or more mortgage loans from the seller and receives loan data for the loans. As previously discussed, such information may comprise various items of information regarding the loan itself, how the seller made or pursued the loan, or even information regarding the borrower or the property which the borrower is purchasing with the loan proceeds. In addition to information provided by the seller, if desirable, information may also be obtained from other sources such as the borrower, credit reporting agencies, or financial institutions, and so on.

At step 620, the loan data is applied to the probabilistic model 348. Loan data may be separately applied to the probabilistic model 348 for each loan, and step 620 may be repeated for each loan that is purchased.

At step 630, the repurchase risk probability is determined using, at least in part, the information received in step 610. If no other parameters are taken into account, then determining the repurchase risk may merely comprise receiving the outputs of the model 348 for each loan. If other parameters are taken into account (e.g., monetary quantifiers, business rules, thresholds, and so on), as described above, then determining the repurchase risk may further comprise taking such other parameters into account.

At step 640, feedback is provided to the seller regarding the repurchase risk for the mortgage loans(s). As described previously, such feedback may comprise one or more reports which provide an indication of the repurchase risk (e.g., pass/fail, repurchase risk score, and so on) in connection with each loan. The seller may then use such information as it considers appropriate, e.g., to improve its underwriting processes, to manage its repurchase risk, and so on.

Figure 7:
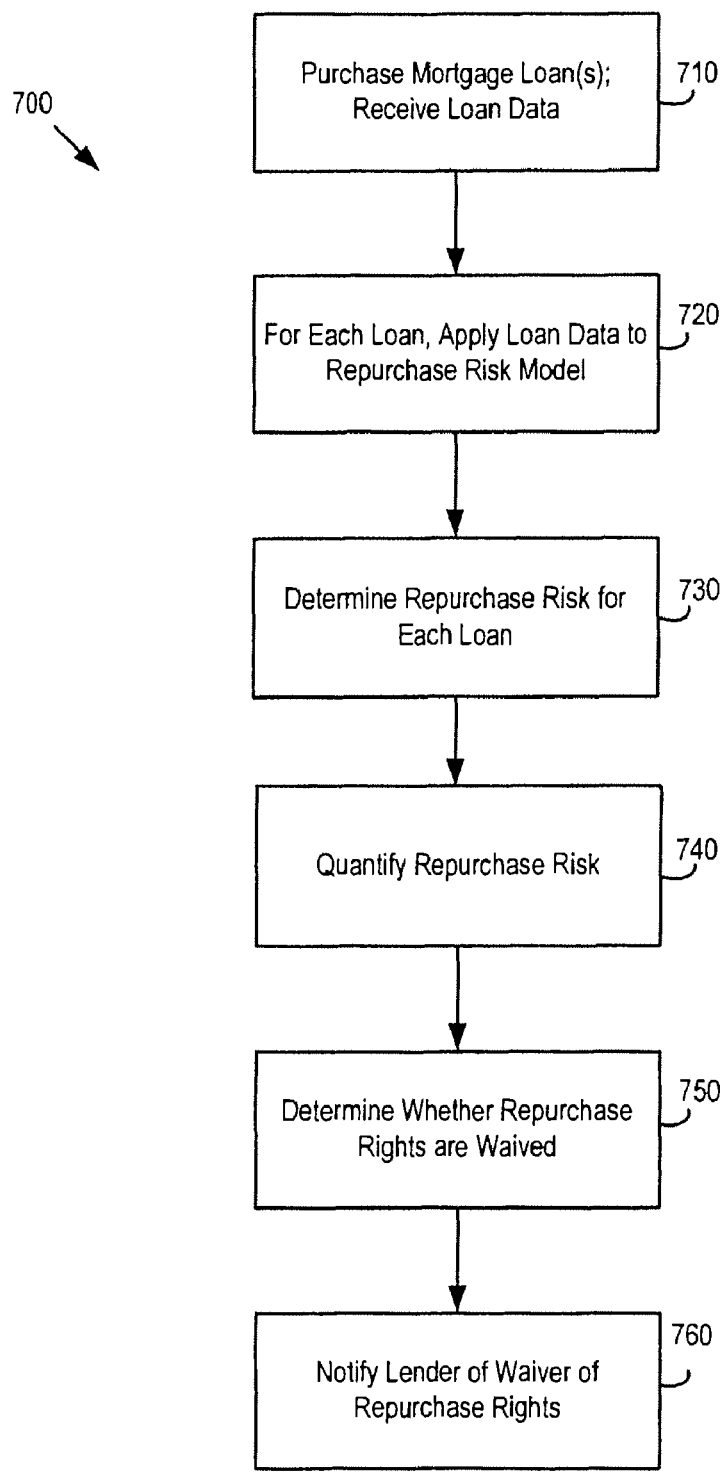
FIG. 7 is a block diagram illustrating another method for a loan purchaser to manage repurchase rights according to an embodiment.

Referring now to FIG. 7, FIG. 7 is similar to FIG. 6 except that it shows an arrangement in which repurchase rights are waived. The arrangement of FIG. 7 may be used individually or in combination with the arrangement of FIG. 6. Steps 710-730 in FIG. 7 may be performed as described above in connection with steps 610-630 in FIG. 6. At step 740, the repurchase risk calculated in step 730 is quantified. For example, as previously discussed, the probability calculated at step 730 is multiplied by the monetary amount of the loan (e.g., the unpaid principal balance) to provide a quantified value. This quantified value represents the potential economic loss to the purchaser rather than only the likelihood of a loss. In step 750, it is determined whether repurchase rights are waived for the loan. The determination whether to waive the repurchase rights may be performed as described above in connection with waiver logic 456. Finally, at step 760, the seller is notified of the waiver of repurchase rights.

Figure 8:
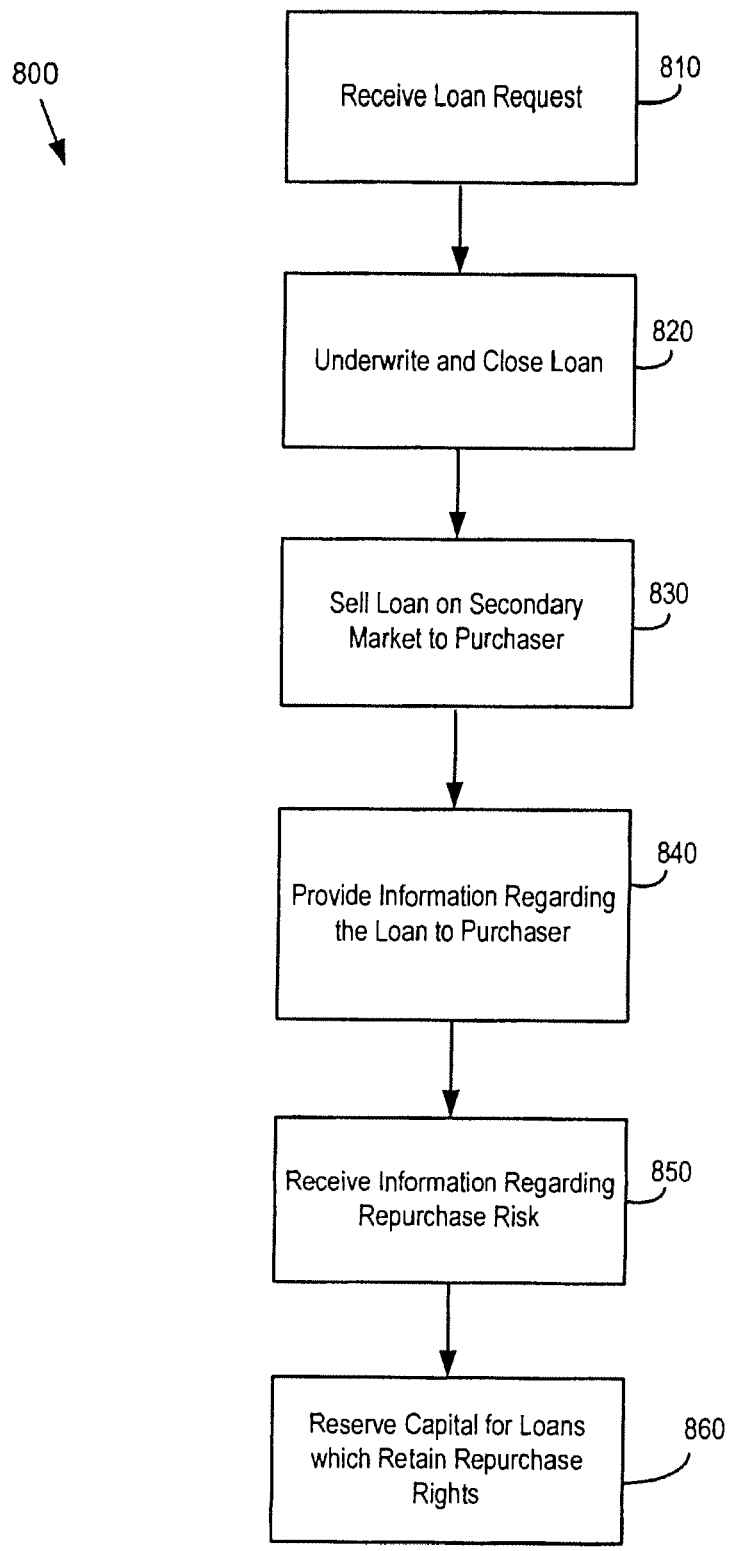
FIG. 8 is a block diagram illustrating a method for a seller to manage repurchase rights according to an embodiment.

Referring to FIG. 8, FIG. 8 illustrates a method 800 in which feedback information regarding repurchase risk is received from a purchaser. Unlike FIGS. 6-7, the method of FIG. 8 is shown as being performed by a seller rather than a purchaser.

At step 810, a request for a loan is received by the seller (here, assumed to be a lender) from a borrower. At step 820, the lender underwrites and closes the loan. As part of the underwriting and closing process, the lender typically collects much of the information discussed above in regard to the information received by the purchaser at steps 610 and 720. At step 830, the seller sells the loan on the secondary market to the purchaser. At step 840, at delivery, the seller provides information to the purchaser regarding the loan.

As discussed in regard to the methods of FIGS. 6-7, a purchaser may utilize the information provided in step 840 to calculate the repurchase risk, to provide feedback regarding the repurchase risk, to determine whether to waive repurchase rights, or for other reasons. In step 850, the seller receives feedback information and/or information regarding the repurchase rights. In step 860, the seller reserves capital for those loans for which the purchaser has retained a repurchase right. In one embodiment, the lender utilizes the repurchase risk to determine the appropriate amount of capital to hold in reserve.

Figure 9:
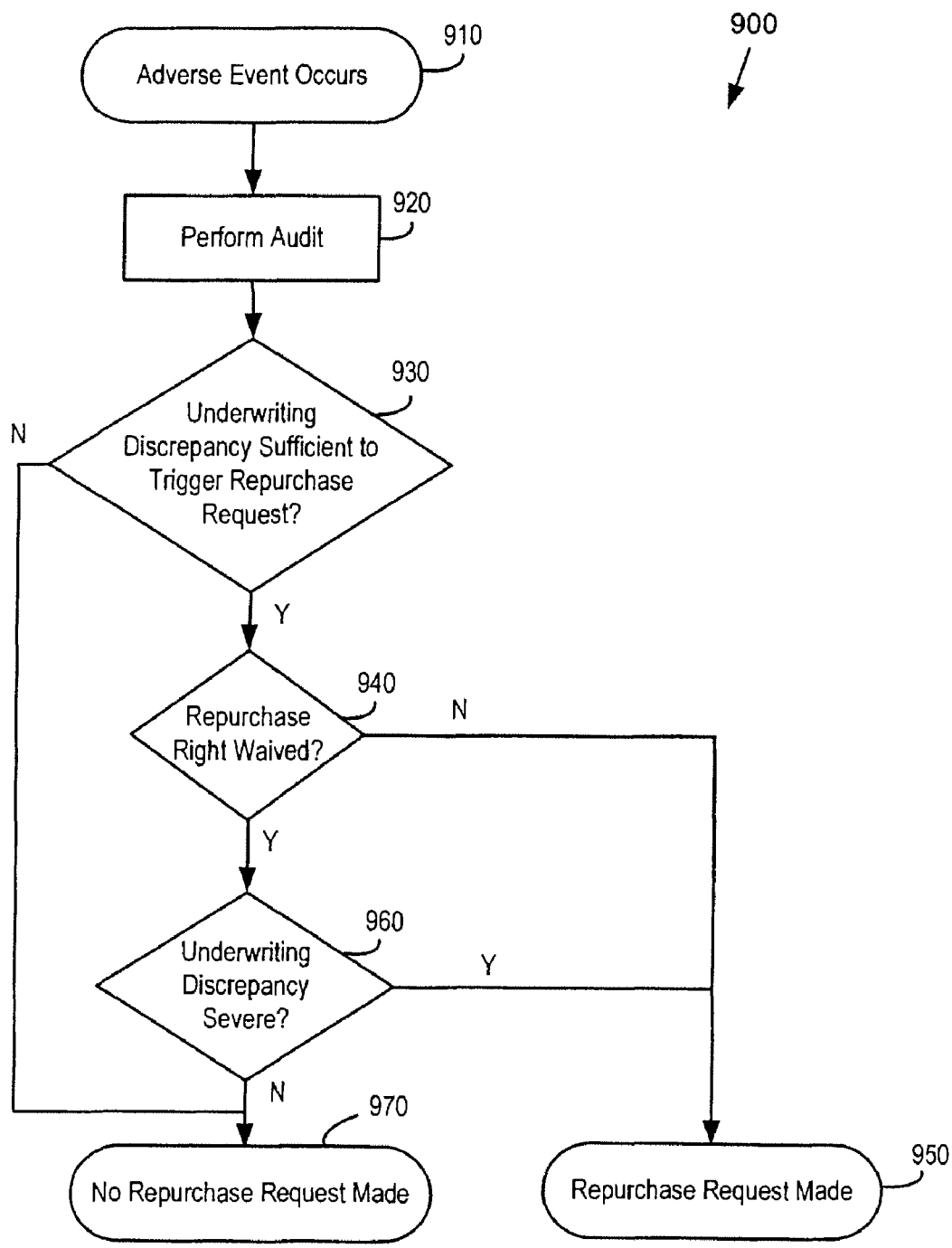
FIG. 9 is a block diagram illustrating a method of the resolution of an adverse event in connection with a loan according to an embodiment.

Referring now to FIG. 9, FIG. 9 illustrates a method 900 that may be implemented by a purchaser after an adverse event occurs in connection with a loan (e.g., delinquency, default, and so on). At step 910, the adverse event occurs. At step 920, an audit is performed to determine whether there are any underwriting discrepancies. At step 930, it is determined whether the underwriting discrepancies, if any, are sufficient (by the terms of the sale contract) to trigger a repurchase request. If not, then the process terminates and no repurchase request is made (step 970). That is, essentially, the purchaser had complete and accurate information when it performed its underwriting, and although the loan may have gone into default, a repurchase request is not warranted.

At step 940, if there are underwriting discrepancies sufficient to trigger a repurchase request, then the repurchase rights database 457 is accessed and it is determined whether the repurchase rights for the loan were waived. If the repurchase rights were not waived, then a repurchase request is made at step 950. At step 960, if the repurchase rights were waived, then it is further determined based on the earlier audit whether there were any severe underwriting discrepancies. If there were no severe underwriting discrepancies, then no repurchase request is made at step 970. It may be noted that a repurchase request make take a variety of forms. For example, the seller may be asked to repurchase the loan before default. As another example, the seller may be asked to repurchase a real estate owned property after loan default and pay the purchaser its make-whole amount (unpaid principal balance plus costs). As another example, the seller may be asked to pay the purchaser's make-whole amount after the purchaser sells the defaulted real estate owned property (unpaid principal balance plus costs minus revenues before the make whole payment). Other repurchase requests are also possible.

The method of and system for evaluating a loan may generally be implemented as part of a computerized system. For example, engines and systems of system 100 may utilize existing computer capabilities, both hardware and software, and electronic communication links, for example, to receive and process (e.g., in real time) loan data provided by a broker, a lender, etc. Seller system 110 and purchaser system 130 and engines and subsystems thereof may be implemented on computer systems or devices and may include computer servers. An exemplary computer system or device may include a general purpose computing device including a processing unit, a system memory, and a system bus that couples various system components including the system memory to the processing unit. The system memory may include read only memory (ROM) and random access memory (RAM). The computer may also include a magnetic hard disk drive for reading from and writing to a removable magnetic disk, and an optical disk drive for reading from or writing to a removable optical disk such as a CD-ROM or other optical media. The drives and their associated computer-readable media provide nonvolatile storage of computer-executable instructions, data structures, program modules, and other data for the computer. Systems 110 and 130 may be implemented on a separate logical server or using separate physical devices.

Exemplary computer systems or servers in system 100 may operate under the control of computer software to carry out the process steps described herein. Computer software for each system or engine may include a set of software objects and/or program elements including computer-executable instructions collectively having the ability to execute independently in a separate thread or logical chain of process evaluation, while permitting the flow of data inputs therebetween. Computer-executable instructions comprise, for example, instructions and data which cause a general or special purpose computer system or processing device to perform a certain function or group of functions.

Data may be communicated between the various systems and engines of system 100 in real time over the Internet or other computer network environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. It will be appreciated that such network computing environments will typically encompass many types of computer system configurations, including personal computers, hand-held devices, multi-processor systems, microprocessor-based or programmable consumer electronics, network PCs, mini-computers, mainframe computers, and the like. System 100 may also be implemented in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

It will be further appreciated that system 100 may perform fewer or additional functions as compared to those described herein. For example, an entity (e.g., a lending institution) that performs only some of the above-mentioned processes may use a computer system that contains only a subset of the functions described herein. Additionally, one or more of the systems or functions of system 100 may be variously combined in alternative configurations.

The foregoing description of embodiments has been presented for purposes of illustration and description. It is not intended to be exhaustive or to be limited to the precise forms disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto and their equivalents.

What is claimed is:

1. A method of managing loan repurchase rights for a plurality of loans, the method comprising:
   determining a repurchase risk for each of the plurality of loans;
   waiving repurchase rights on a first subset of the plurality of loans which have the repurchase risk below a predetermined threshold; and
   notifying a lender of which loans have repurchase rights that have been waived and which loan repurchase rights that have been retained.

2. A method of evaluating the repurchase risk of a mortgage loan at the time of delivery, the method comprising:
   receiving at a purchaser computer system, information, from a seller computer system, related to the loan, the loan having a repurchase right associated therewith requiring a lender who originated the loan to repurchase the loan from a purchaser upon request by the purchaser if certain events have occurred;
   determining by the purchaser computer system a joint probability, at least in part based upon the information relating to the loan, of an underwriting discrepancy and an adverse event in connection with the loan; and
   determining by the purchaser computer system a loan repurchase risk based on the joint probability.

3. A method of managing loan repurchase rights for a loan, the method comprising:
   receiving a waiver of repurchase rights if the repurchase risk is below a predetermined threshold; and
   reducing capital reserves based upon the receipt of a waiver of repurchase rights.

4. A method of evaluating the repurchase risk of a mortgage loan at the time of delivery, the method comprising:
   receiving at a purchaser computer system, information, from a seller computer system, related to the loan, the loan having a repurchase right associated therewith requiring a lender who originated the loan to repurchase the loan from a purchaser upon request by the purchaser if certain events have occurred;
   determining by the purchaser computer system a joint probability, at least in part based upon the information relating to the loan, of an underwriting discrepancy and an adverse event in connection with the loan;
   determining by the purchaser computer system a loan repurchase risk, reflecting a risk of the repurchase right becoming exercisable, based upon the joint probability;
   storing the determined repurchase risk in a computerized database of the purchaser computer system; and
   communicating to the seller computer system a repurchase risk report regarding the loan repurchase risk.

5. The method of claim 4, wherein communicating the repurchase risk report includes identifying if the loan has a repurchase risk above a predetermined risk threshold.

6. The method of claim 5, wherein communicating the repurchase risk report includes providing feedback information regarding what portions of the information provided to the purchaser contributed to the repurchase risk being classified as above the predetermined risk threshold.

7. The method of claim 4, wherein communicating the repurchase risk report includes identifying whether repurchase rights have been waived.

8. The method of claim 4, wherein communicating the repurchase risk report includes providing a repurchase risk score.

9. The method of claim 4, wherein communicating the repurchase risk report includes classifying the loan based on repurchase risk probability.

10. The method of claim 4, wherein communicating the repurchase risk report includes classifying the loan based on quantified repurchase risk.

11. The method of claim 4, wherein communicating the repurchase risk report includes providing a calculated repurchase risk score or a quantified repurchase risk for the loan.

12. A method of evaluating the repurchase risk of a mortgage loan at the time of delivery, the method comprising:
   providing to a purchaser computer system, information, from a seller computer system, related to one or more loans, each of the one or more loans having a repurchase right associated therewith requiring a lender who originated the loan to repurchase the loan from a purchaser upon request by the purchaser if certain events have occurred;
   receiving from the purchaser computer system a repurchase risk report regarding a repurchase risk for each of the one or more loans, the repurchase risk at least in part based upon the information relating to the loan, of an underwriting discrepancy and an adverse event in connection with the loan.

13. The method of claim 12, further comprising determining, in the seller computer system, if repurchase rights have been waived for each of the one or more loans.

14. The method of claim 12, wherein receiving the repurchase risk report includes identifying if the one or more loans have a repurchase risk above a predetermined risk threshold.

15. The method of claim 14, wherein receiving the repurchase risk report includes receiving feedback information regarding what portions of the information provided to the purchaser contributed to the repurchase risk being classified as above the predetermined risk threshold.

16. The method of claim 12, wherein receiving the repurchase risk report includes notification whether repurchase rights have been waived.

17. The method of claim 12, wherein communicating the repurchase risk report includes receiving a repurchase risk score.

18. The method of claim 12, further comprising calculating a quantified repurchase risk.

19. The method of claim 12, further comprising calculating a probability of exercise of repurchase rights based in part on the repurchase risk.

20. The method of claim 12, wherein receiving the repurchase risk report includes providing a calculated repurchase risk score or a quantified repurchase risk for the loan.

* * * * *